United States Patent
Chan

(10) Patent No.: US 7,511,384 B2
(45) Date of Patent: Mar. 31, 2009

(54) DC CONVERSION SYSTEM

(75) Inventor: Cheng Ron Chan, Yonghe (TW)

(73) Assignee: Gaya Co., Ltd., Tainan (TW)

( * ) Notice: Subject to any disclaimer, the term of this patent is extended or adjusted under 35 U.S.C. 154(b) by 91 days.

(21) Appl. No.: 11/637,179

(22) Filed: Dec. 12, 2006

(65) Prior Publication Data

US 2008/0136365 A1   Jun. 12, 2008

(51) Int. Cl.
  *H02P 9/00*   (2006.01)
(52) U.S. Cl. ............................ 290/1 R; 290/7; 290/50; 363/39
(58) Field of Classification Search ................... 363/39, 363/45, 37; 290/1 R, 1 A, 7, 50; 322/22
  See application file for complete search history.

(56) References Cited

U.S. PATENT DOCUMENTS

| | | | |
|---|---|---|---|
| 6,169,669 B1 * | 1/2001 | Choudhury | 363/37 |
| 6,775,156 B1 * | 8/2004 | Lin et al. | 363/21.01 |
| 6,791,853 B2 * | 9/2004 | Afzal et al. | 363/142 |
| 6,809,678 B2 * | 10/2004 | Vera et al. | 341/166 |
| 7,365,998 B2 * | 4/2008 | Kumar et al. | 363/39 |

* cited by examiner

*Primary Examiner*—Nicholas Ponomarenko
(74) *Attorney, Agent, or Firm*—Rosenberg, Klein & Lee

(57) ABSTRACT

A DC conversion system includes a power-generating device, a power storage device, and a DC boost circuit. The power-generating device transforms power from natural resources such as solar power and wind force into a direct current power source. The direct current voltage output from the power-generating device can be stepped up directly from 6-12 volts to high voltage of 200-680 volts by the DC boost circuit and thereby obviate the need to perform a DC to AC conversion.

9 Claims, 2 Drawing Sheets

DC CONVERSION SYSTEM

FIELD OF THE INVENTION

The present invention relates to a DC (direct current) conversion system that converts energy from natural resources into a direct current power source, and more particularly to a DC conversion system that is capable of preventing the unnecessary loss of energy resources during a boost process.

BACKGROUND OF THE INVENTION

With the progress of society and technology, human beings have progressively increased reliance on electric power. Electric power is mostly obtained by conversion from petroleum or the coal. Due to the gradual exhaustion of energy resources, the significantly increased price of petroleum, and the increase of environmental consciousness, numerous alternative energy resources such as solar power, wind force, and fuel cells have recently been proposed, so as to reduce the dependence on petroleum and coal.

However, the existing alternative energy resources can only output direct current power which has a voltage of about 12 volts. For the purpose of supplying electric power for illumination devices of courtyards, factories, residences offices, restaurants/stores, night streetlamps, or department stores/superstores, the electric power must be first converted into alternating current (AC) power . In addition a high actuation voltage of about 500-680 volts and a working voltage of about 200-380 volts, required for persistent illumination, must also be supplied for the illumination devices. In fact, the process of converting direct current into alternating current causes a 20 percent energy loss, resulting in an unnecessary loss of energy resources.

SUMMARY OF THE INVENTION

In order to overcome the defects of the prior art, a major object of the present invention is to disclose a DC conversion system that utilizes natural wind force and solar power or combines hydrogen and oxygen so as to generate electric power. In addition, the loss of the electric power caused by the boost process and the conversion of power from direct current to alternating current can be avoided.

Another object of the present invention is to disclose a DC conversion system that has a DC boost circuit for providing a high voltage for transient actuation of the illumination devices and providing the working voltage after the illumination devices have been actuated. In addition, the DC conversion system also has a frequency conversion circuit for receiving the load signal of the illumination devices so as to modulate the working frequency properly. As a result, the loss of power can be reduced. In addition, the purposes of saving the electric power and reducing the damage to electronic devices can be achieved.

A further object of the present invention is to disclose a DC conversion system, which is connected to an off-peak charger. As a result, when an accident or natural disaster causes a sudden voltage drop, an unusual frequency, or a sudden power failure to the power supply system, power can be timely supplied with sufficient electric power, so as to prevent the power supply system and the illumination devices that are connected thereto from damage, thereby increasing the reliability of the power supply system.

DETAILED DESCRIPTION OF THE PREFERRED EMBODIMENT

The description taken with the drawings make the structures, features, and embodiments of the present invention apparent to those skilled in the art as to how the present invention may be embodied in practice.

Figure 1:
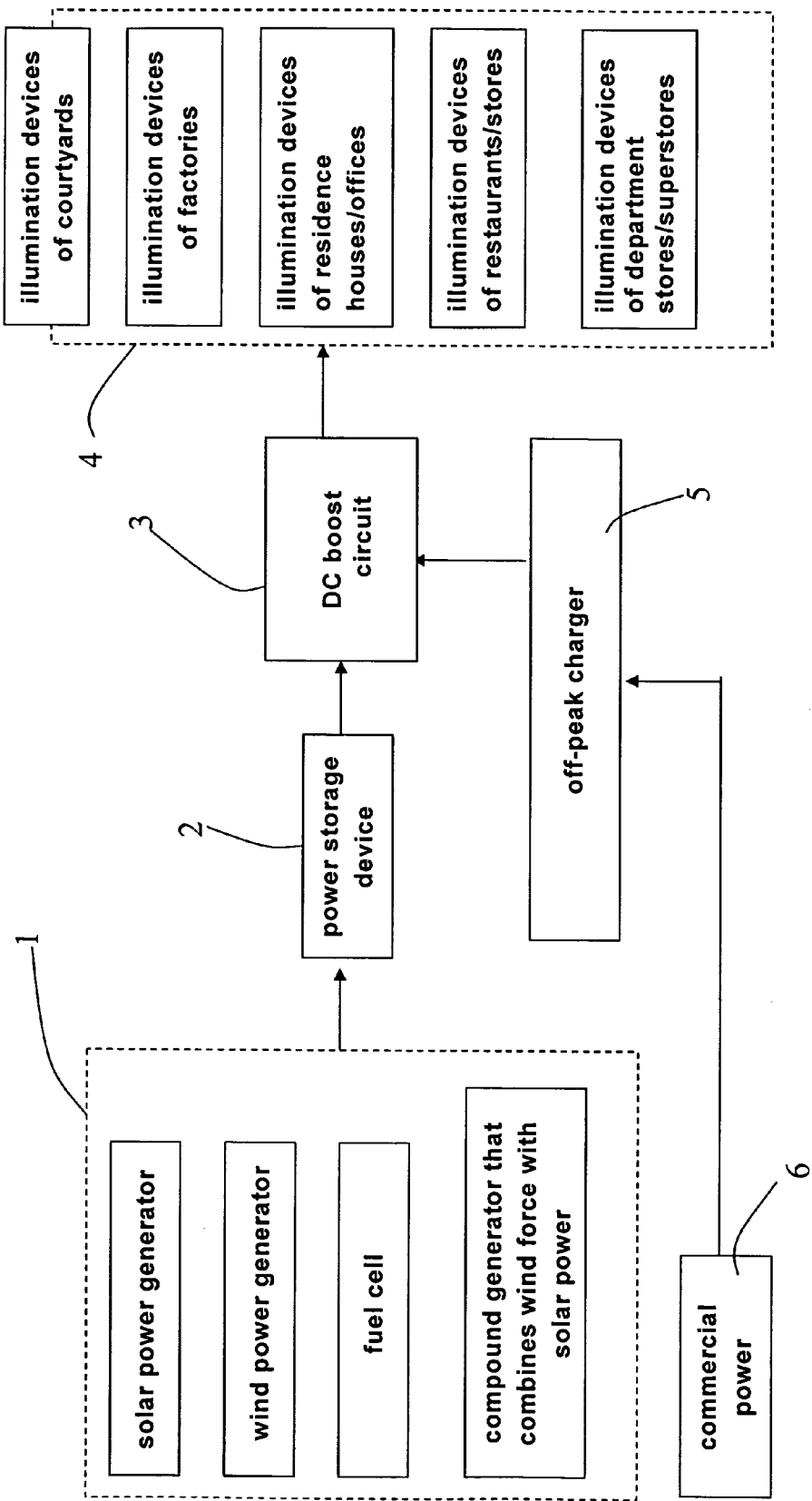
FIG. 1 is a process diagram of the present invention.
Figure 2:
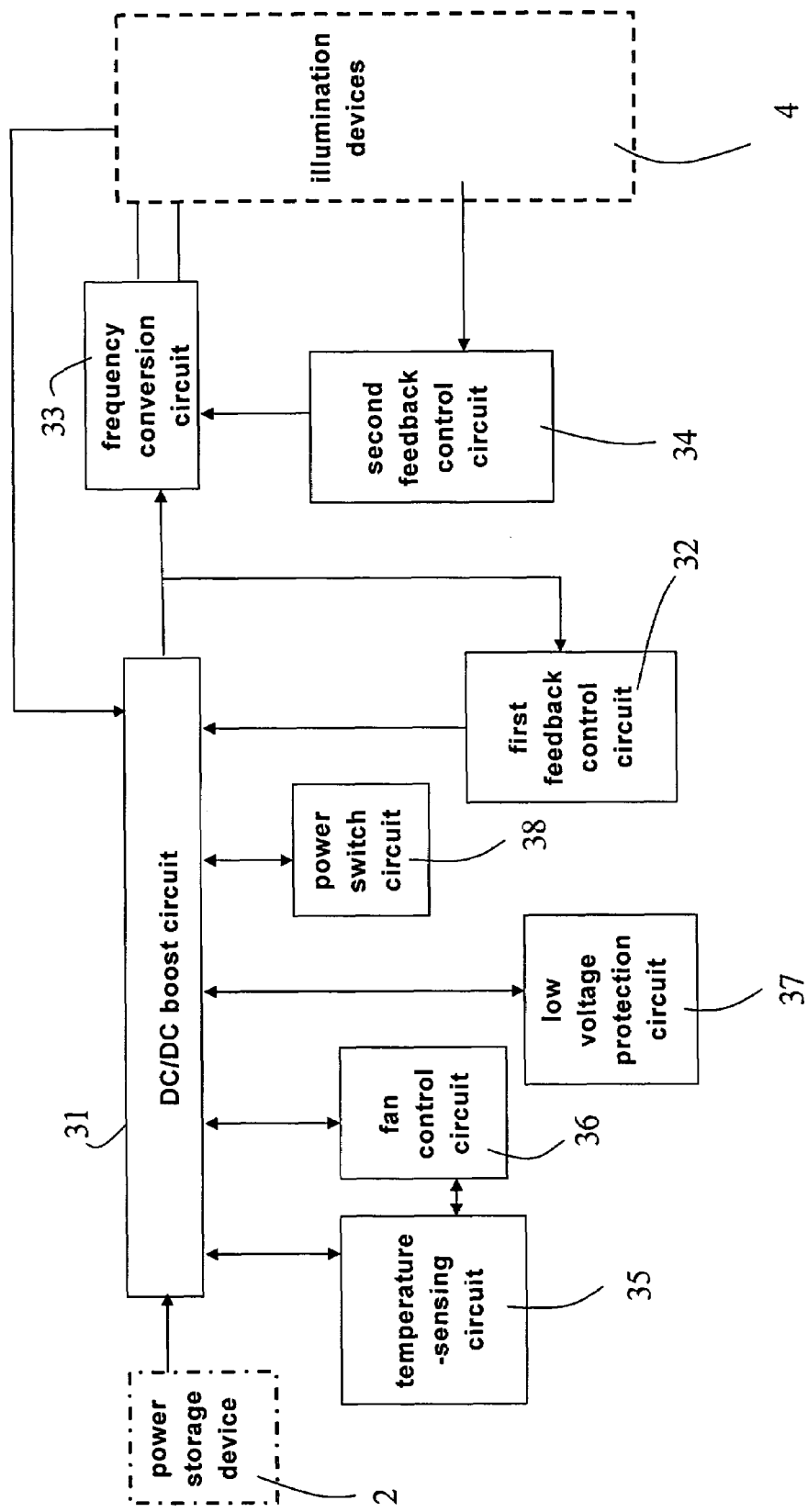
FIG. 2 is block diagram showing the DC boost circuit of the present invention.

Referring to FIG. 1 and FIG. 2, a preferred embodiment of a DC conversion system of the present invention comprises a power-generating device 1, a power storage device 2, and a DC boost circuit 3.

The power-generating device 1 utilizes wind force and solar power or combines hydrogen and oxygen so as to form electric power. The power-generating device 1 is a wind power generator, a solar power generator, a fuel cell, or a compound generator that combines wind force with solar power, wherein the fuel cell combines hydrogen with oxygen to generate electric power. Moreover, the water formed by the power generating process of the fuel cell does not pollute the environment or destroy ecological systems.

The power storage device 2 is electrically connected with the power-generating device 1 for storing the electric power output from the power-generating device 1. The power storage device 2 can output DC power with a voltage of 12, 24, or 36volts if there is a desire to actuate illumination devices 4 of courtyards, factories, residence houses/offices, restaurants/stores, night streetlamps, or department stores/superstores.

The DC boost circuit 3 provides the high voltage for actuation of the illumination devices 4 and the working voltage after actuation of the illumination devices 4. However, in the stable working status, the illumination devices 4 require a working voltage of about 200 volts to 380 volts. In addition, in the transient actuation status, the illumination devices 4 require an actuation voltage of 500 volts to 680 volts or a higher voltage to actuate the lamp tube. Accordingly, the DC boost circuit 3 must provide the function of stepping up the voltage so as to supply the required electric power for the illumination devices 4, which are in the transient actuation status or the stable working status.

Furthermore, the DC boost circuit 3 comprises a DC/DC boost circuit 31, a first feedback control circuit 32, a frequency conversion circuit 33, and a second feedback control circuit 34, wherein the DC/DC boost circuit 31 is electrically connected with a power output terminal of the power storage device FIG. 2. When the DC boost circuit 3 wants to actuate the illumination devices 4, the DC/DC boost circuit 3 1 transforms the voltage into the alternating current voltage and steps up the voltage to 500 -680 volts or a higher value so as to actuate the illumination devices 4. If the illumination devices 4, which are lighted up, are in the stable working status, the alternating current voltage is stepped down to the working voltage of about 200 - 380 volts by the DC/DC boost circuit 31, wherein this working voltage is supplied for the illumination devices 4 persistently.

The first feedback control circuit 32 can receive the feedback signals of the DC/DC boost circuit 31 and the illumination devices 4 for controlling the voltage output of the DC/DC boost circuit 31. Accordingly, before the actuation of the illumination devices 4, the DC/DC boost circuit 31 is controlled to output the higher working voltage than that in the stable working status. After lighting up the illumination devices 4, the working voltage applied to the illumination devices 4 is stepped down so as to provide the illumination devices 4 with optimum power. As a result, the electric power loss problem of the conventional circuit, which is caused by the conversion of power source from direct current to alternating current, can be avoided.

In addition, the frequency conversion circuit 33 is electrically connected with the DC/DC boost circuit 31 so as to modulate the voltage's frequency outputted from the DC/DC boost circuit 31, wherein the voltage's frequency can be modulated by a pulse width modulation (PWM) method for controlling the output of the frequency conversion circuit 33.

Furthermore, the second feedback control circuit 34 can receive the voltage signal outputted from the frequency conversion circuit 33 for further controlling the voltage's frequency outputted from the frequency conversion circuit 33. For example, if the load of the illumination devices 4 is lightened, the pulse width of the voltage signal of the frequency conversion circuit 33 is narrowed by the feedback control of the second feedback control circuit 34 so as to correspondingly step down the voltage inside the frequency conversion circuit 33 for triggering the frequency conversion process. As a result, the frequency conversion circuit 33 can properly adjust the outputted pulse width according to the load's degree of the illumination devices 4 so as to change the outputted working frequency, thereby saving energy resources and electric power.

Referring again to FIG. 2, the DC/DC boost circuit 31 has a temperature-sensing circuit 35 for detecting the temperature of the DC/DC boost circuit 31 and transmitting a signal to a fan control circuit 36. Accordingly, the DC/DC boost circuit 31 outputs the electric power for rotating an external fan (not shown) when the temperature is raised to a first predetermined value such as about 45 degree Celsius. In addition, the rotation of the external fan is stopped when the temperature is reduced to a second predetermined value such as the room temperature. As a result, the stability of the DC/DC boost circuit 31 can be increased.

Referring again to FIG. 2, the DC/DC boost circuit 31 further has a low voltage protection circuit 37 and a power switch circuit 38, wherein the low voltage protection circuit 37 is electrically connected with the DC/DC boost circuit 31. If the low voltage protection circuit 37, which detects the voltage signal, senses that the voltage outputted from the DC/DC boost circuit 31 has a low value, the power switch circuit 38 opens the DC/DC boost circuit 31 to protect the electronic devices on the circuit from damage. For example, if the discharge voltage of the power storage device 2 for load reaches 10.5 volts, a LED lamp (not shown) may be additionally mounted on the circuit so as to emit the orange alarm light. Moreover, if the discharge voltage of the power storage device 2 for load is persistently at 10 volts, the low voltage protection circuit 37 will be actuated to cut off the load of the power storage device 2 for preventing the direct current power source from entering the power storage device 2 so as to protect the power storage device 2 against damage. Therefore, the lifetime of the power storage device 2 can be elongated.

Referring again to FIG. 1, the DC boost circuit 3 is connected to an off-peak charger 5 for replenishing the lost electric power with the commercial power 6 during the off-peak hours. As a result, when the accident or the nature disaster causes the suddenly dropped voltage, the unusual frequency, or the sudden power failure to the power supply system, the DC boost circuit 3 can be timely provided with sufficient electric power so as to prevent the power supply system and the illumination devices 4 that is connected thereto from damage, thereby increasing the reliability of the power supply system.

From the description mentioned above, the present invention utilizes the solar power, the wind force, the hydrogen, and the oxygen, which are inexhaustible natural resources. In addition, the power-generating process of the present invention does not pollute or destroy the ecological system and does not cause any environmental problem. As a result, the present invention practically complies with all kinds of international requirements for environmental protection. Furthermore, the DC boost circuit of the present invention can timely modulate the working voltage and the working frequency according to the load's degree of the illumination devices so that the efficiency can be improved, the unnecessary power loss can be reduced, and the purpose of saving electric power can be achieved.

On the basis of the description mentioned above, the present invention indeed satisfies the requirements for patentability since it provides practicability and has never been published or used publicly. Therefore, it is submitted for a patent.

With the invention thus explained, it is apparent that various modifications and variations can be made without departing from the scope of the invention. It is therefore intended that this invention be limited only as indicated in the appended claims.

What the invention claimed is:

1. A DC conversion system having a power-generating device for converting energy from natural resources into electric power, the conversion system including:
   a power storage device electrically connected to said power-generating device for storing said electric power output from said power-generating device; and
   a DC boost circuit having an input coupled to said power storage device and an output coupled to a lighting load for providing a high actuation voltage to said lighting load for initiation thereof and a working voltage to said initiated lighting load for continued operation thereof.

2. The DC conversion system of claim 1, wherein said power-generating device is a solar power generator.

3. The DC conversion system of claim 1, wherein said power-generating device is a wind power generator.

4. The DC conversion system of claim 1, wherein said power-generating device is a compound generator that combines wind force with solar power.

5. The DC conversion system of claim 1, wherein said power-generating device is a fuel cell.

6. The DC conversion system of claim 1, wherein said DC boost circuit is connected to an off-peak charger, and said off-peak charger has an input terminal for electrical connection with a source of commercial power.

7. The DC conversion system of claim 1, wherein said DC boost circuit comprises:
   a DC/DC boost circuit for providing said lighting load with said actuation voltage and said working voltage;
   a first feedback control circuit coupled to said DC/DC boost circuit for detecting output voltage signals of said DC/DC boost circuit and said lighting load to control a voltage output from said DC/DC boost circuit;
   a frequency conversion circuit electrical connected to said DC/DC boost circuit to modulate a voltage frequency output from said DC/DC boost circuit; and
   a second feedback control circuit coupled to said frequency conversion circuit for receiving a voltage signal outputted from said frequency conversion circuit to further control a pulse width output from said frequency conversion circuit.

8. The DC conversion system of claim 7, wherein said DC/DC boost circuit has a temperature-sensing circuit for detecting the temperature of said DC/DC boost circuit and transmitting a signal to a fan control circuit.

9. The DC conversion system of claim 7, wherein said DC/DC boost circuit further has a low voltage protection circuit and a power switch circuit, wherein said low voltage protection circuit detects a voltage signal so as to control the action of said power switch circuit.

* * * * *